(12) United States Patent
Shirai

(10) Patent No.: US 7,684,066 B2
(45) Date of Patent: Mar. 23, 2010

(54) INFORMATION PROCESSING APPARATUS AND METHOD FOR CONTROLLING PRINTING OPERATIONS TO A PLURALITY OF PRINTERS, AND A PROGRAM FOR IMPLEMENTING THE CONTROL METHOD

(75) Inventor: Kenichi Shirai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1134 days.

(21) Appl. No.: 11/215,320

(22) Filed: Aug. 30, 2005

(65) Prior Publication Data

US 2006/0044594 A1    Mar. 2, 2006

(30) Foreign Application Priority Data

Aug. 30, 2004    (JP)    ............... 2004-250929

(51) Int. Cl.
*G06K 15/00* (2006.01)
(52) U.S. Cl. ............... 358/1.14; 358/1.13; 358/1.15; 702/185; 702/183
(58) Field of Classification Search ............... 358/1.14, 358/1.13, 1.15; 702/185, 183
See application file for complete search history.

(56) References Cited

U.S. PATENT DOCUMENTS 5,625,757 A * 4/1997 Kageyama et al. ......... 358/1.14

| | | | | |
|---|---|---|---|---|
| 6,633,394 B2 * | 10/2003 | Nagasawa et al. | ........... | 358/1.14 |
| 6,724,494 B1 * | 4/2004 | Danknick | ............... | 358/1.14 |
| 7,221,465 B1 * | 5/2007 | Shimada | ............... | 358/1.14 |
| 7,330,281 B2 * | 2/2008 | Ferlitsch | ............... | 358/1.13 |
| 2002/0046312 A1 * | 4/2002 | Nakamura | ............... | 710/301 |
| 2003/0025928 A1 * | 2/2003 | Nagasawa et al. | ........... | 358/1.14 |
| 2003/0076522 A1 * | 4/2003 | Simpson et al. | ............ | 358/1.14 |

FOREIGN PATENT DOCUMENTS

JP         2002-063004         2/2002
JP         2002063004 A   *   2/2002

* cited by examiner

*Primary Examiner*—Mark K Zimmerman
*Assistant Examiner*—Jacky X Zheng
(74) *Attorney, Agent, or Firm*—Cowan, Liebowitz & Latman, P.C.

(57) ABSTRACT

The print schedules of a plurality of printers are managed. Status data of the plurality of printers are monitored. When any failure has occurred in a printer that serves as an output destination of print data as a result of monitoring, an alternative printer that executes alternative print processing of the print data is selected with reference to the managed print schedules. It is determined based on printer information of the selected alternative printer and the print schedule of the print data in the printer that has caused the failure whether or not the alternative print processing by the selected alternative printer is to be executed. The alternative print processing is executed based on the determination result.

17 Claims, 22 Drawing Sheets

FIG. 7

ORDER MANAGER

FILE(F) VIEW(V) SETTING(S) ORDER(Q)

DISPLAY LIST | ORDER IN PROCESSING ▼ | SWITCH USER VIEW | ALL ▼ | LOGIN USER: KATO

701:

| ORDER NAME | ORDER ID | PERSON IN CHARGE | PROCESSING STATUS |
|---|---|---|---|
| ● STANDARD TEST PATTERN | 00000005 | so001 | |
| □ SUB-ORDER 001 | 00000011 | | WAIT FOR ESTIMATION APPROVAL 2003/05/25 |
| ◇ SPECIFICATION | so001 | | PERSON IN CHARGE NOT ASSIGNED |
| □ SUB-ORDER 001 | | | |
| ● XXXXXX | 00000020 | | PERSON IN CHARGE NOT ASSIGNED |
| ⊚ SPECIFICATION 2 | 00000022 | | ORDER FIXED 2003/05/05 |

702:

BASIC INFORMATION | DELIVERY INFORMATION

[🧮 ESTIMATION] [✕ RECEPTION REJECTION] [✉ MAIL TO ORDERER] [📧 ORDER COMPLETE] [SWITCH PERSON IN CHARGE] [⟳ UPDATE]

[CONNECT TO SERVER]

[ORDER INFORMATION]
ORDER ID: 00000005
ORDER NAME: STANDARD TEST PATTERN
NUMBER OF SUB-ORDERS: 1
DATE OF ORDER: 2003-04-07T09:25:15
DESIRED DATE OF DELIVERY:
SCHEDULED DATE OF DELIVERY:
REQUIREMENTS:
[ORDERER INFORMATION]
ORDERER NAME: KANEKO
ZIP:
Address:
TEL:
E-MAIL:

700:

[MEMO] UNDER CREATION

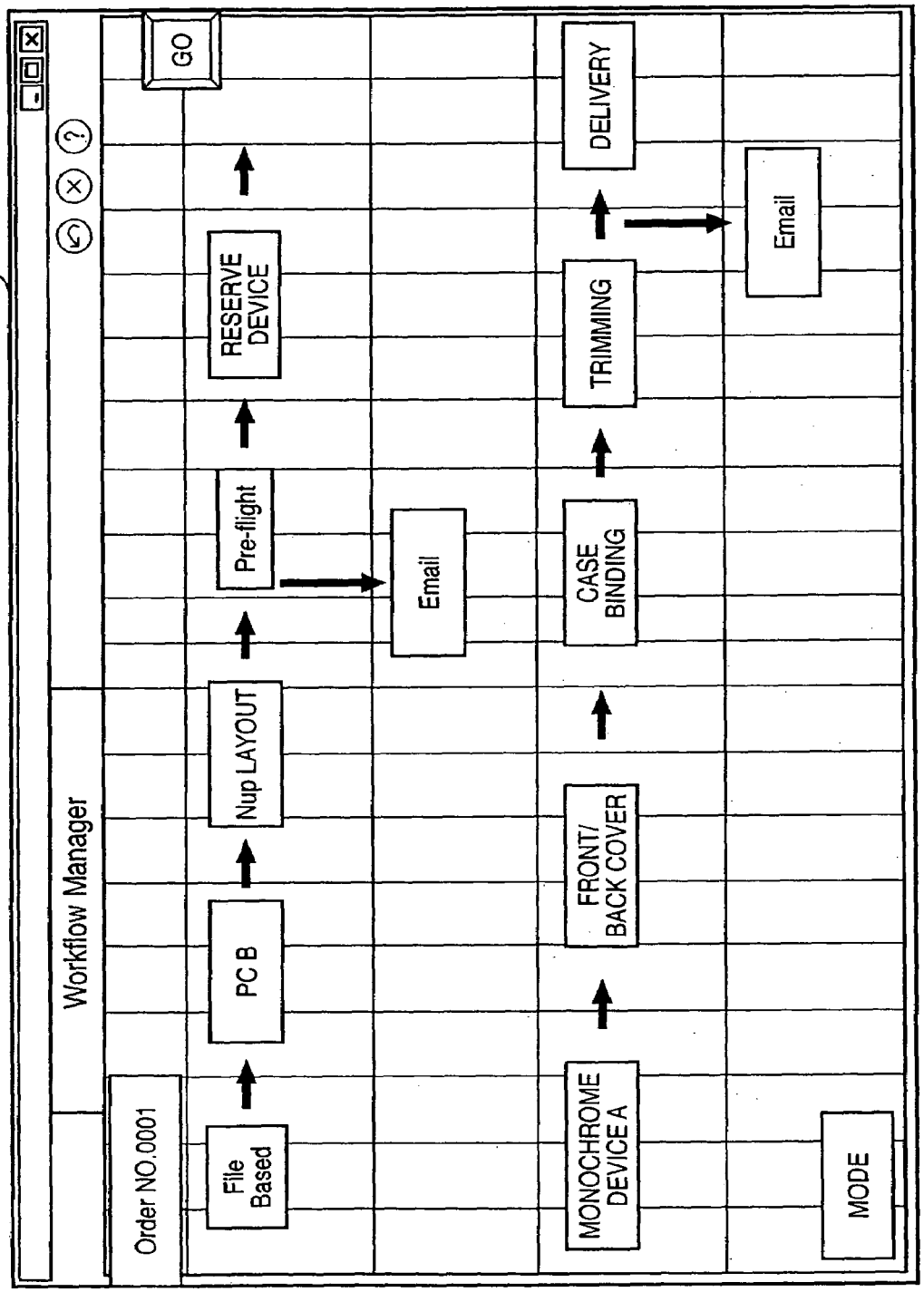

DEVICE SCHEDULER
FILE(F)  VIEW(V)  MANAGEMENT LINE(C)  SCHEDULE(E)  SETTING(S)  HELP(H)
UPDATE SCHEDULE

MAY 2003
| SUN | MON | TUE | WED | THU | FRI | SAT |
|---|---|---|---|---|---|---|
| 27 | 28 | 29 | 30 | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 | 31 |
| 1 | 2 | 3 | 4 | 5 | 6 | 7 |

TODAY: 2003/05/30

LINE INFORMATION
LINE NAME: HIGH-SPEED PRINTER
TYPE: MONOCHROME PRINTER
LOCATION: PASSAGE SIDE (NORTH)
PROCESSING SPEED: 101 PPM
COMMENTS:

RESERVATION INFORMATION
ORDER NAME: SPECIFICATION
TYPE: NORMAL RESERVATION
DATE: 2003/05/30
      0345 – 10:00
RESERVER: NORI KATO
OPERATOR: AKIRA KIDA
MEMO

1001 — ONE DAY / WEEK
1002 — (schedule entries)
1003 — (menu)

| TIME | 8 | 9 | 10 | 11 | 12 | 13 | 14 | 15 | 16 | 17 | 18 |
|---|---|---|---|---|---|---|---|---|---|---|---|
| HIGH-SPEED PRINTER | | SPECIFICATION AKIRA KIDA | | | MANUAL TARO YAMADA | | | | | | |
| COLOR PRINTER | | | | BROCHURE ICHIRO SUZUKI | | | | | | | |
| MID-SPEED PRINTER 1 | | PERIODIC MAINTENANCE KONISHI | | | | LECTURE REFERENCE AKIRA KIDA | | | | | |
| MID-SPEED PRINTER 2 | | | | | | | | | | | |
| MID-SPEED PRINTER 3 | | | | | | | | | | | |
| MID-SPEED PRINTER 4 | | | | | | | | | | | |
| MID-SPEED PRINTER 5 | | | | | | | | | | | |

FIG. 12

DEVICE(D)  VIEW(V)  SETTING(S)  HELP(H)

ALL ▼

| PRINTER NAME | STATUS | ADDRESS | ADMINISTRATOR | LOCATION |
|---|---|---|---|---|
| HIGH-SPEED PRINTER | PRINTING | 191.191.191.1 | ICHIRO SATO | PASSAGE SIDE (NORTH) |
| COLOR PRINTER | WAITING | 191.191.191.2 | HANAKO YAMADA | PASSAGE SIDE (NORTH) |
| MID-SPEED PRINTER 1 | WAITING | 191.191.191.3 | ICHIRO SATO | PASSAGE SIDE (SOUTH) |
| MID-SPEED PRINTER 2 | WAITING | 191.191.191.4 | ICHIRO SATO | PASSAGE SIDE (SOUTH) |
| MID-SPEED PRINTER 3 | WAITING | 191.191.191.5 | ICHIRO SATO | WINDOW SIDE (WEST) |
| MID-SPEED PRINTER 4 | WAITING | 191.191.191.6 | ICHIRO SATO | WINDOW SIDE (WEST) |
| .. | .. | .. | .. | .. |

FIG. 14A

| ITEM | | MEANING (SETTING VALUE) |
|---|---|---|
| ORDER GENERAL INFORMATION | SERVICE TYPE | OUTPUT/BOOKBINDING SERVICE |
| | | POSTER/PANEL |
| | | COPY SERVICE |
| | | RE-ORDER |
| | | SAVE DOCUMENT |
| | ORDER NAME | ARBITRARY CHARACTER STRING |
| | ORDER ID | 32-BYTE UNIQUE CHARACTER STRING |
| | DOCUMENT ENTRY METHOD | NETWORK ENTRY |
| | | MEDIA ENTRY |
| | FINISHING METHOD | 1 FILE→1 DOCUMENT |
| | | PLURAL FILES→1 DOCUMENT |
| | | PLURAL FILES→PLURAL DOCUMENTS |

F I G. 14B

| | NUMBER OF UPLOADED FILES | NUMBER OF ENTERED DOCUMENT FILES |
|---|---|---|
| | UPLOADED FILE NAME | ARBITRARY CHARACTER STRING |
| | FILE ID | 32-BYTE UNIQUE CHARACTER STRING |
| | NUMBER OF PAGES | DESIGNATE NUMERICAL VALUE |
| | OS TYPE | Windows/Macintosh/Unix |
| FILE INFORMATION | DOCUMENT CREATION APPLICATION | Microsoft Word |
| | | Microsoft Excel |
| | | ... |
| | | OTHER |
| | APPLICATION VERSION | ARBITRARY CHARACTER STRING |

FIG. 14C

| PRINT STYLE | FINISHED SIZE | B0, A0, B1, A1, , |
|---|---|---|
| | ORIENTATION OF OUTPUT PAPER | PORTRAIT |
| | | LANDSCAPE |
| | BOOKBINDING TYPE | CASE BINDING |
| | | SADDLE STITCHING |
| | | RING BINDING |
| | | STAPLING |
| | | OTHER (COMMENTS) |
| | BINDING DIRECTION | LEFT (WIDTH DESIGNATION IS NOT AVAILABLE) |
| | | RIGHT (WIDTH DESIGNATION IS NOT AVAILABLE) |
| | | TOP (WIDTH DESIGNATION IS NOT AVAILABLE) |
| | | OTHER (COMMENTS) |
| | PRINT (BODY TEXT) | ONE-SIDED |
| | | DOUBLE-SIDED |
| | COLOR MODE (BODY TEXT) | MONOCHROME |
| | | COLOR |

FIG. 14D

| PRINT STYLE | PAPER TYPE (BODY TEXT) | MONOCHROME STANDARD PAPER |
| --- | --- | --- |
| | | COLOR STANDARD PAPER |
| | | THICK PAPER (THICKNESS DESIGNATION AVAILABLE) |
| | | GLOSSY THICK PAPER |
| | | COLOR PAPER (COLOR DESIGNATION AVAILABLE) |
| | | MONOCHROME OHP FILM |
| | | COLOR OHP FILM |
| | PUNCH HOLES | 2 HOLES, 3 HOLES, 4 HOLES, 6 HOLES, 30 HOLES,... |
| | FOLDING | 2-FOLD, 3-FOLD, X-FOLD |
| | COVER SHEET | PUT COVER |
| | | NO COVER |
| | PRINT (FRONT COVER) | NOT PRINT |
| | | ONE-SIDED |
| | | DOUBLE-SIDED |
| | PRINT (BACK COVER) | NOT PRINT |
| | | ONE-SIDED |
| | | DOUBLE-SIDED |
| | COLOR MODE (COMMON TO FRONT/BACK COVER) | MONOCHROME |
| | | COLOR |

FIG. 16

| |  |
|---|---|
| TOTAL NUMBER OF PAGES | ～1601 |
| NUMBER OF PRINTED PAGES | ～1602 |
| COLOR/MONOCHROME | ～1603 |
| FINISHING | ～1604 |
| PRINT TIME PERIOD DESIGNATION | ～1605 |
| PRINTER NAME | ～1606 |
| ALTERNATIVE PRINTER NAME | ～1607 |
| ... | |

INFORMATION PROCESSING APPARATUS AND METHOD FOR CONTROLLING PRINTING OPERATIONS TO A PLURALITY OF PRINTERS, AND A PROGRAM FOR IMPLEMENTING THE CONTROL METHOD

FIELD OF THE INVENTION

The present invention relates to an information processing apparatus for controlling a print system formed by connecting a plurality of printers via a network and its control method, and a program.

BACKGROUND OF THE INVENTION

Conventionally, printing agents which generate prints in accordance with requests from customers such as personal users, corporations, and the like exist. Such printing agent provides a service for generating prints on the basis of print data (original) and orders including a print style, the number of copies, due date, and the like from the customer, and making a delivery to the customer. Such printing agent provides the service using a large-scale apparatus such as a long-established offset reproduction printing press or the like.

Nowadays, with the advent of high-speed and high-image quality electrophotographic and ink-jet printing apparatuses, a business category of commercial printing called "copy service", "printing service", "Print On Demand (POD) center", or the like is present.

A print request is made to such printing agent in such a manner that the user mails or directly brings a document recorded on paper sheets or in a digital medium (FD, MO, CD-ROM, or the like) and a print order sheet (order instruction) that describes the number of copies to be printed, bookbinding method, due date, and the like of that document into the printing company (document entry).

Also, a system that can issue/receive print orders on-line via the Internet or intranet has been in practical use. For example, in "DotDoc.Web" available from Fuji Xerox Co., Ltd., the user can place a print order by accessing a home page provided by the printing agent from a computer of his or her company. More specifically, the user accesses that home page, fills in required items such as orderer information (receiving address or the like), print style, the number of copies, and the like of a print request form, and submits the print request form together with a document file. In this way, the user can place a print order of that document file.

Upon reception of the request from the user, the printing agent side generates a print order sheet, and forms a schedule of the print processing. Print and bookbinding processes are executed by a printer connected to a work computer, and generated prints are delivered to the customer in accordance with the schedule, thus ending the service.

The printing agent which executes the print processing requested by the user must complete the print processing with stable quality in time for the designated due date. Also, in a large-scale printing center, a plurality of operators must parallelly process many print requests (orders) using a large variety of printing apparatuses and work computers. For this purpose, resources such as staffs (operators), apparatuses, and the like need to be efficiently utilized as much as possible.

As a more practical problem of the printing agent, when any abnormality has occurred in a printer, a process may halt, and the subsequent process schedule may stop. If a large variety of printers are used, the use states of the printers must be recognized, and management must be made to prevent processes from backing up due to any abnormality of the printers.

In order to solve such problem, Japanese Patent Laid-Open No. 2002-63004 discloses a print control apparatus which changes the start/end times of a print job written in a schedule management table in accordance with the processing states of the printers. In this Japanese Patent Laid-Open No. 2002-63004, when any abnormality has occurred in a printer, a system that prints automatically using a normal alternative printer (alternative printing function) is proposed.

However, in the above prior art, the general alternative printing function immediately starts an alternative printer if any abnormality is found in a printer. However, since print processing is executed in an environment in which no abnormality preferably occurs, it is desired for the user to output to the last using a printer which is designated as a print destination initially. For this reason, if the abnormality that has occurred in a printer can be immediately recovered, an alternative printer is preferably not used. On the other hand, in order to complete the print processing within a scheduled time and to meet the due date, it is sometimes necessary to perform the alternative print processing.

SUMMARY OF THE INVENTION

The present invention has been made to solve the aforementioned problems, and has as its object to provide an information processing apparatus which can efficiently and appropriately implement a print schedule, its control method, and a program. This object is achieved by a print system formed by connecting a plurality of printers on a network. Especially, in the present invention, when any abnormality has occurred in an arbitrary printer, the necessity/unnecessity of execution of alternative print processing and its execution timing are determined on the basis of a print schedule and status of that abnormal printer and other printers. In this way, a print schedule can be efficiently and appropriately implemented.

According to the present invention, the foregoing object is attained by providing an information processing apparatus for controlling a print system formed by connecting a plurality of printers via a network, comprising:

management means for managing print schedules of the plurality of printers;

monitor means for monitoring status data of the plurality of printers;

selection means for, when any failure has occurred in a printer serving as an output destination of print data as a result of monitoring by the monitor means, selecting an alternative printer that executes alternative print processing of the print data with reference to the print schedules managed by the management means;

determination means for determining, based on printer information of the alternative printer selected by the selection means and the print schedule of the print data in the printer that has caused the failure, whether or not the alternative print processing is to be executed; and executing means for executing the alternative print processing on the basis of the determination result of the determination means.

In a preferred embodiment, the execution means determines, based on the printer information of the alternative printer selected by the selection means and the print schedule of the print data in the printer that has caused the failure, whether or not an alternative condition used to determine execution of the alternative print processing is satisfied, and executes the alternative print processing using the alternative printer selected by the selection means when the alternative condition is satisfied.

In a preferred embodiment, the apparatus further comprises setting means for, when the alternative print processing by the alternative printer reaches a print schedule of another print data by the alternative printer as a result of monitoring by the monitor means, re-setting an output destination of print data to be printed by the alternative print processing at that time as the printer that has caused the failure.

In a preferred embodiment, the apparatus further comprises setting means for, when the printer that has caused the failure is recovered as a result of monitoring by the monitor means, re-setting an output destination of print data to be printed by the alternative print processing at that time as the printer that has caused the failure.

In a preferred embodiment, when print processing of the print data to be printed by the alternative print processing is not complete yet by the printer that has caused the failure after the re-setting by the resetting means, the selection means re-selects a printer serving as an output destination of the print data to be printed with reference to the print schedules managed by the management means.

In a preferred embodiment, the management means updates contents of the print schedules of the printers associated with the alternative print processing of the print schedules of the plurality of printers managed by the management means on the basis of the execution result of the execution means.

In a preferred embodiment, the management means comprises display control means for controlling to display the print schedules of the plurality of printers stored in storage means on a schedule management window.

In a preferred embodiment, the schedule management window has a schedule display area which displays respective print schedules on time axes defined for respective printers, and the schedule display area displays information indicating a use period of each printer.

In a preferred embodiment, the management means updates contents of the print schedules of the printers associated with the alternative print processing of the print schedules of the plurality of printers managed by the management means on the basis of the execution result of the execution means.

In a preferred embodiment, the information indicating the use period of the printer is expressed by a rectangular region having a width corresponding to the use period on the time axis.

According to the present invention, the foregoing object is attained by providing a method of controlling an information processing apparatus for controlling a print system formed by connecting a plurality of printers via a network, comprising:

a management step of managing print schedules of the plurality of printers;

a monitor step of monitoring status data of the plurality of printers;

a selection step of selecting, when any failure has occurred in a printer serving as an output destination of print data as a result of monitoring in the monitor step, an alternative printer that executes alternative print processing of the print data with reference to the print schedules managed in the management step;

a determination step of determining, based on printer information of the alternative printer selected in the selection step and the print schedule of the print data in the printer that has caused the failure, whether or not the alternative print processing is to be executed; and an executing step of executing the alternative print processing on the basis of the determination result in the determination step.

According to the present invention, the foregoing object is attained by providing a program for implementing control of an information processing apparatus for controlling a print system formed by connecting a plurality of printers via a network, comprising:

a program code of a management step of managing print schedules of the plurality of printers;

a program code of a monitor step of monitoring status data of the plurality of printers;

a program code of a selection step of selecting, when any failure has occurred in a printer serving as an output destination of print data as a result of monitoring in the monitor step, an alternative printer that executes alternative print processing of the print data with reference to the print schedules managed in the management step;

a program code of a determination step of determining, based on printer information of the alternative printer selected in the selection step and the print schedule of the print data in the printer that has caused the failure, whether or not the alternative print processing is to be executed; and a program code of an executing step of executing the alternative print processing on the basis of the determination result in the determination step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 shows an example of an operation window of an order manager according to the embodiment of the present invention;

FIG. 9 shows an example of a workflow manager according to the embodiment of the present invention;

FIG. 10 shows an example of a device scheduler according to the embodiment of the present invention;

FIG. 11 shows an example of a job manager according to the embodiment of the present invention;

FIG. 12 shows an example of a device manager according to the embodiment of the present invention;

FIGS. 14A to 14D show examples of order information according to the embodiment of the present invention;

FIG. 16 shows an example of job information of a print job according to the embodiment of the present invention;

DESCRIPTION OF THE PREFERRED EMBODIMENTS

Preferred embodiments of the present invention will be described in detail in accordance with the accompanying drawings.

Figure 1:
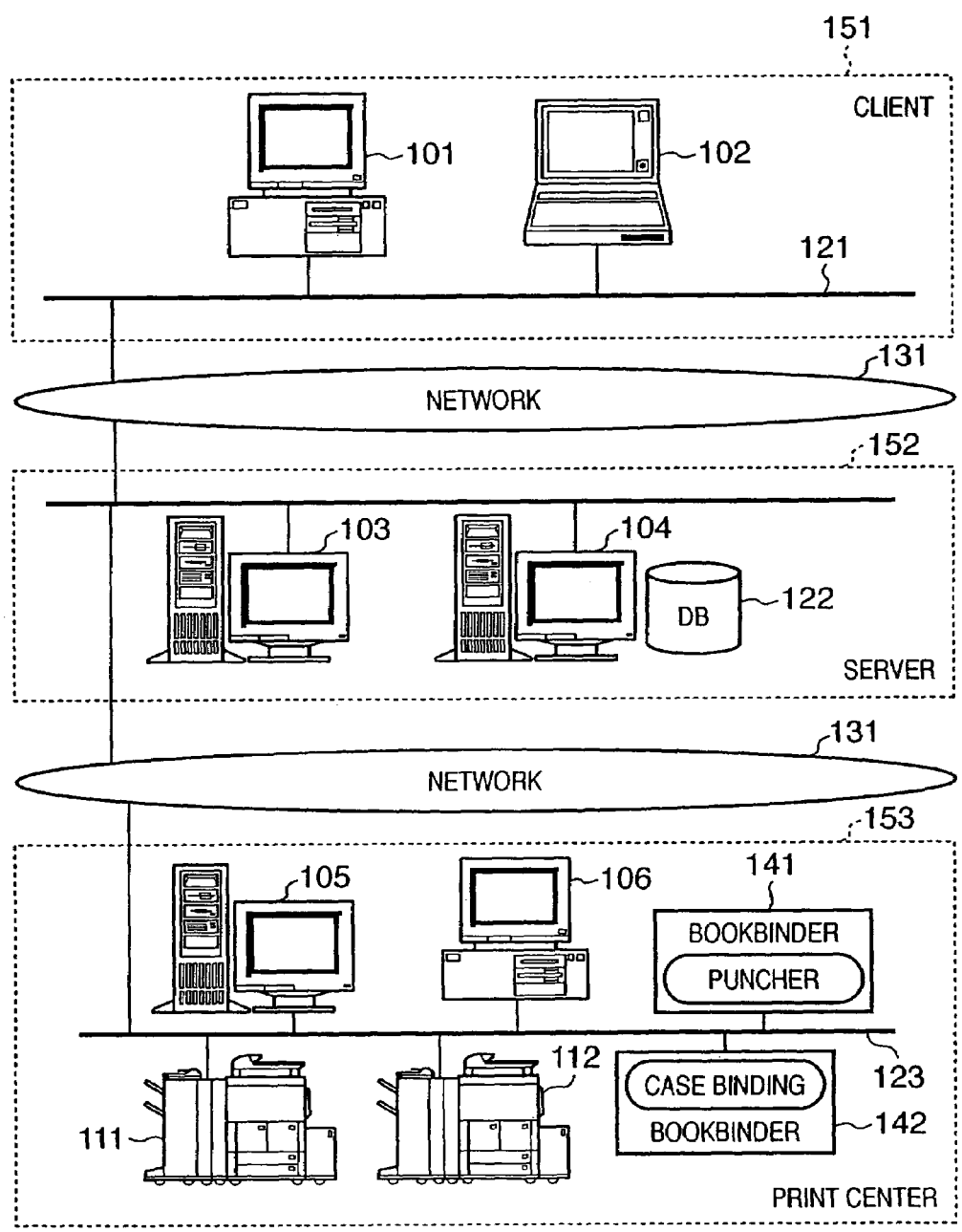
FIG. 1 is a diagram showing the overall arrangement of a print system according to an embodiment of the present invention.

FIG. 1 shows the overall arrangement of a print system according to an embodiment of the present invention.

Note that an environment of the entire print system in the following description is adopted for the sake of easy understanding of the description of the present invention, and the present invention is not limited to such specific environment.

Referring to FIG. 1, a client 151 corresponds to a notebook type PC (personal computer) 102 connected via a network at user's residence or a business PC 101 connected to the intranet in a company. The business PC 101 and notebook type PC 102 are connected to a network 131 via a LAN 121.

A server 152 includes a WEB server 103 that provides document entry contents which accept reception of print request data and entry of document data from the user. The server 152 also includes a DB server 104 which stores the entered print request data as order sheet data (order ticket) and stores the digitally entered document data.

Note that the WEB server 103 and DB server 104 can be housed together in a single housing. However, in the description of the present invention, they are separately housed in two housings for the sake of simplicity. The WEB server 103 and DB server 104 are connected to the network 131 via a LAN 122.

A plurality of print centers 153 can exist with respect to the server 152. The server 152 distributes and manages information for various printers on the basis of information of various printers equipped in the print centers 153. Each print center 153 periodically collects order sheet data and document data stored in the server 152 from the DB server 104.

Each print center 153 includes terminals such as a server 105 on which the print system itself of the present invention runs, and a work PC 106 which is used to manipulate various services provided by the server 105 using a GUI, and the like. In addition, the print center 153 includes printers such as a monochrome printer 111, color printer 112, and the like, which are used as actual output destinations. Furthermore, the print center 153 includes bookbinders 141 (puncher function) and 142 (wrapping binding function), and the like used in offline bookbinding. Respective apparatuses equipped in the print center 153 are connected to each other via a LAN 123, and are connected to the network 131 via this LAN 123.

Note that the arrangement and environment of the print center 153 are merely an example, and the present invention is not limited to the arrangement shown in FIG. 1.

In this embodiment, the client 151 and server 152, and the server 152 and print center 153 are connected via the network (e.g., Internet/Intranet) 131. Normally, the client 151 and server 152 are often connected via the Internet. Also, the server 152 and print center 153 are often connected via the Intranet using a dedicated line. However, the present invention is not limited to such specific arrangement, and can be applied to an arrangement in which the print center 153 includes the server 152.

A browser used to access document entry contents provided by the WEB server 103 is installed in the notebook type PC 102 and business PC 101 as the client 151. As this browser, Internet Explorer available from Microsoft Corporation is normally used, but Netscape available from Netscape Communications Corp. or the like may be used. Using the document entry contents, document data can be uploaded.

The WEB server 103 provides the document entry contents. The document entry contents contain an edit control used to input a print style of bookbinding or the like, print settings such as the number of copies, paper size, and the like, a due date of delivery, orderer information, a delivery destination, and the like. In addition, the document entry contents contain various controls used to submit a print request such as a file designation control used to update document data and the like.

Note that processes such as a fee calculation (when a print fee is charged) according to the input request contents, a fixing process of input items, and the like are implemented by a service module which runs on the WEB server 103. However, since these processes are general logics, and are not directly related to the present invention, a description thereof will be omitted. Furthermore, the WEB server 103 stores order sheet data (which describes print request contents and a file name of document data) and document data corresponding to the fixed print request in the DB server 104.

A general database such as Oracle Database available from Oracle is installed in the DB server 104. The DB server 104 can transmit desired order sheet data and document data in response to a data acquisition request from the server 105 to be described later.

A DB schema (not shown) mainly comprises a print center master (having information such as a location, contact address, and the like, and a device master and bookbinder master as members) table, a device master (device configuration information such as color/monochrome, the number of pages to be printed, an option, and the like) table, and a bookbinder master (information of a puncher, case binder, and the like) table. With reference to these master tables, the server 105 in each print center 153 can receive order sheet data associated to the self center.

The server 105 receives an order fixed message from the WEB server 103, and collects order sheet data and document data from the DB server 104. In addition, the server 105 activates a print system including an order manager, workflow manager, job manager, device manager, and device scheduler (to be described later).

The work PC 106 is a work computer which reads out consoles that control various services provided by the server 105 via operation windows (GUIs) and document data stored in the server 105, and launches a predetermined application to manage the print style. Also, the work PC 106 is a work computer which is used to input a print instruction on the basis of designated print settings.

The monochrome printer 111 and color printer 112 have different installed arrangements depending on the print centers. In general, a combination of a high-speed monochrome printer and a high-quality color printer is preferable. The device scheduler of the server 105 forms a schedule associated with print processing of all these printers.

The bookbinders 141 and 142 are offline bookbinders used to bind printed sheets output from the monochrome printer 111 and color printer 112, and include a stapler, puncher, case binder, and ring binder. Since these bookbinders are connected to the network, the server 105 can collect their status. Also, different installed arrangements are adopted depending on the print centers as in the printers.

The basic hardware arrangement of each of various terminals such as the business PC 101, notebook type PC 102, WEB server 103, DB server 104, server 105, and work PC 106 will be described below using FIG. 2.

Figure 2:
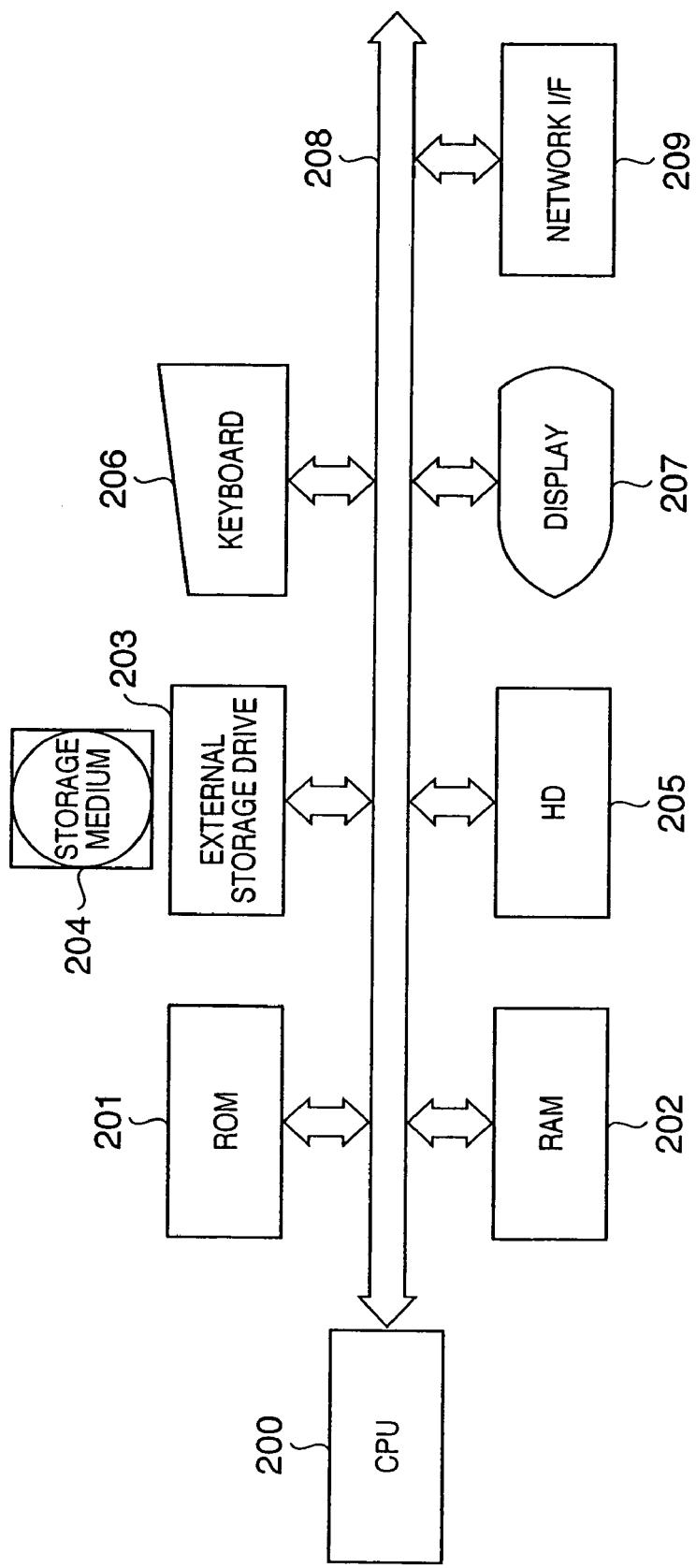
FIG. 2 is a block diagram showing the basic hardware arrangement of a terminal according to the embodiment of the present invention.

FIG. 2 is a block diagram showing the basic hardware arrangement of the terminal according to the embodiment of the present invention.

A CPU 200 executes various programs such as an application program, printer driver program, OS, network printer control program, and the like, which are stored in an HD (hard disk) 205. The CPU 200 controls to temporarily store information required to execute programs and data such as files, and the like in a RAM 202.

A ROM 201 stores various data such as programs such as a basic I/O program and the like, font data and template data used in a document process, and the like. The RAM 202 serves as a main memory, work area, and the like of the CPU 200. An external storage drive 203 can load data such as programs and the like stored in a storage medium 204 to this computer system.

The storage medium 204 stores programs and related data described in this embodiment, and the contents stored in the storage medium 204 will be described later using FIG. 4. As the storage medium 204, various storage media such as a CD-ROM, DVD-ROM/RAM/R/RW, MO, IC memory card, and the like can be used.

The HD 205 stores various programs such as an application program, printer driver program, OS, control program, related program, and the like. A keyboard 206 is used by the user to input commands such as device control commands and the like to the terminal. In addition, a pointing device such as a mouse or the like may be connected.

A display 207 comprises a CRT, liquid crystal display, or the like, and displays various kinds of information such as commands input from the keyboard 206 or pointing device (not shown), printer status, and the like. Reference numeral 208 denotes a system bus which interconnects various components in the terminal and serves as a data transmission/reception path. A network interface (I/F) 209 is a communication interface used to connect the local area network (LAN) or Internet.

A memory map in a state wherein programs that implement the present invention are loaded onto the RAM 202 and are ready to be executed will be described below using FIG. 3.

Figure 3:
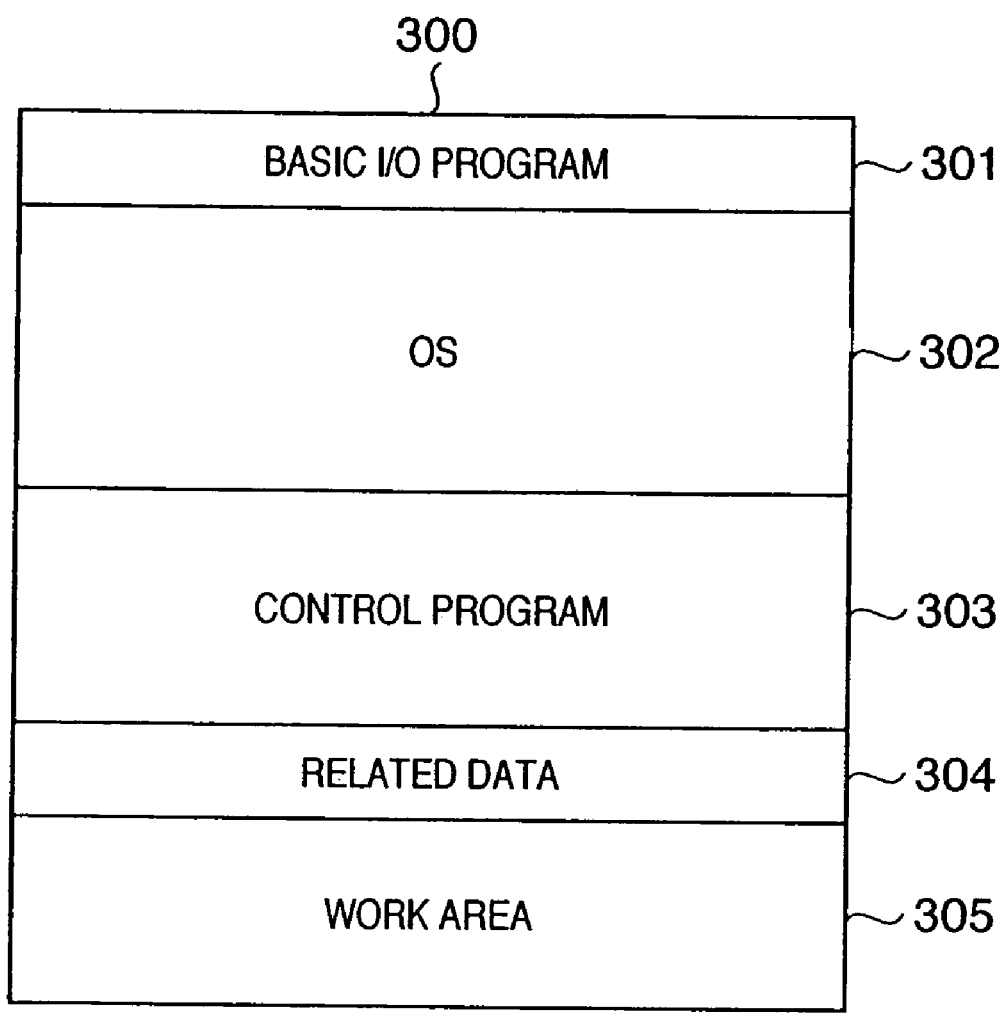
FIG. 3 shows an example of a memory map on a RAM according to the embodiment of the present invention.

FIG. 3 shows an example of the memory map on the RAM according to the embodiment of the present invention.

In the example of this embodiment, programs and related data are directly loaded from the storage medium 204 onto the RAM 202 and are executed. However, the present invention is not limited to this. For example, every time the program of the present invention is launched from the storage medium 204, programs and related data may be loaded from the HD 205 onto the RAM 202. Also, the program of the present invention may be recorded in the ROM 201 to form one field of the memory map, and may be directly executed by the CPU 200.

Referring to FIG. 3, reference numeral 301 denotes a field for storing a basic I/O program. The basic I/O program has various functions. The functions include an IPL (initial program loading) function which loads an OS from the HD 205 onto the RAM 202 and starts the operation of the OS when the power switch of the terminal is turned on, and the like. Reference numeral 302 denotes a field for storing the OS. Reference numeral 303 denotes a field for storing a control program. Reference numeral 304 denotes a field for storing related data (parameters, permanent data, and the like) which are related to various programs such as the control program and the like. Reference numeral 305 denotes a field which forms a work area on which the CPU 200 executes a main program.

The memory map on the storage medium 204 will be described below using FIG. 4.

Figure 4:
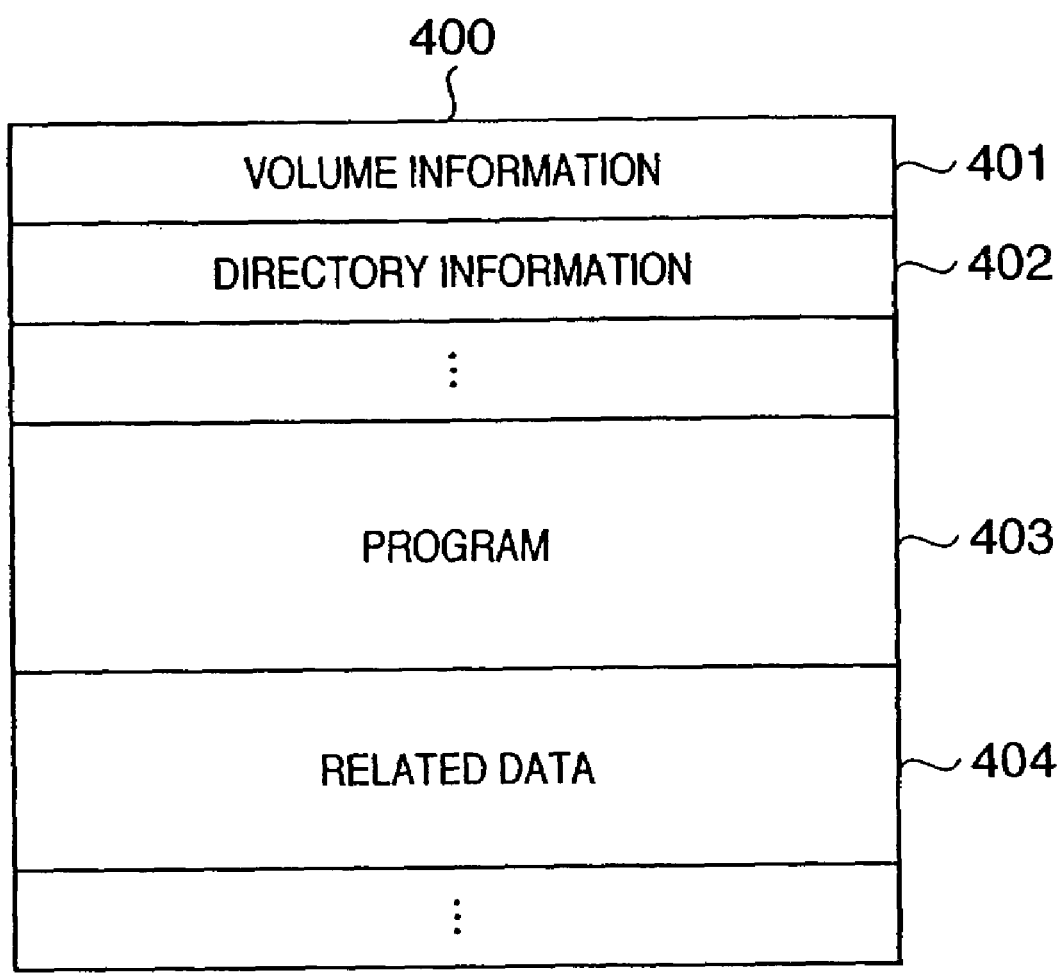
FIG. 4 shows an example of a memory map on a storage medium according to the embodiment of the present invention.

FIG. 4 shows an example of the memory map on the storage medium according to the embodiment of the present invention.

Referring to FIG. 4, reference numeral 400 denotes data contents on the storage medium 204. Reference numeral 401 denotes volume information indicating information of data; 402, directory information; 403, a program used to implement this embodiment; and 404, its related data. Note that the program 403 is required to implement the workflow shown in FIGS. 7 to 9.

The processing sequence of the print system according to this embodiment will be described below using FIG. 5.

Figure 5:
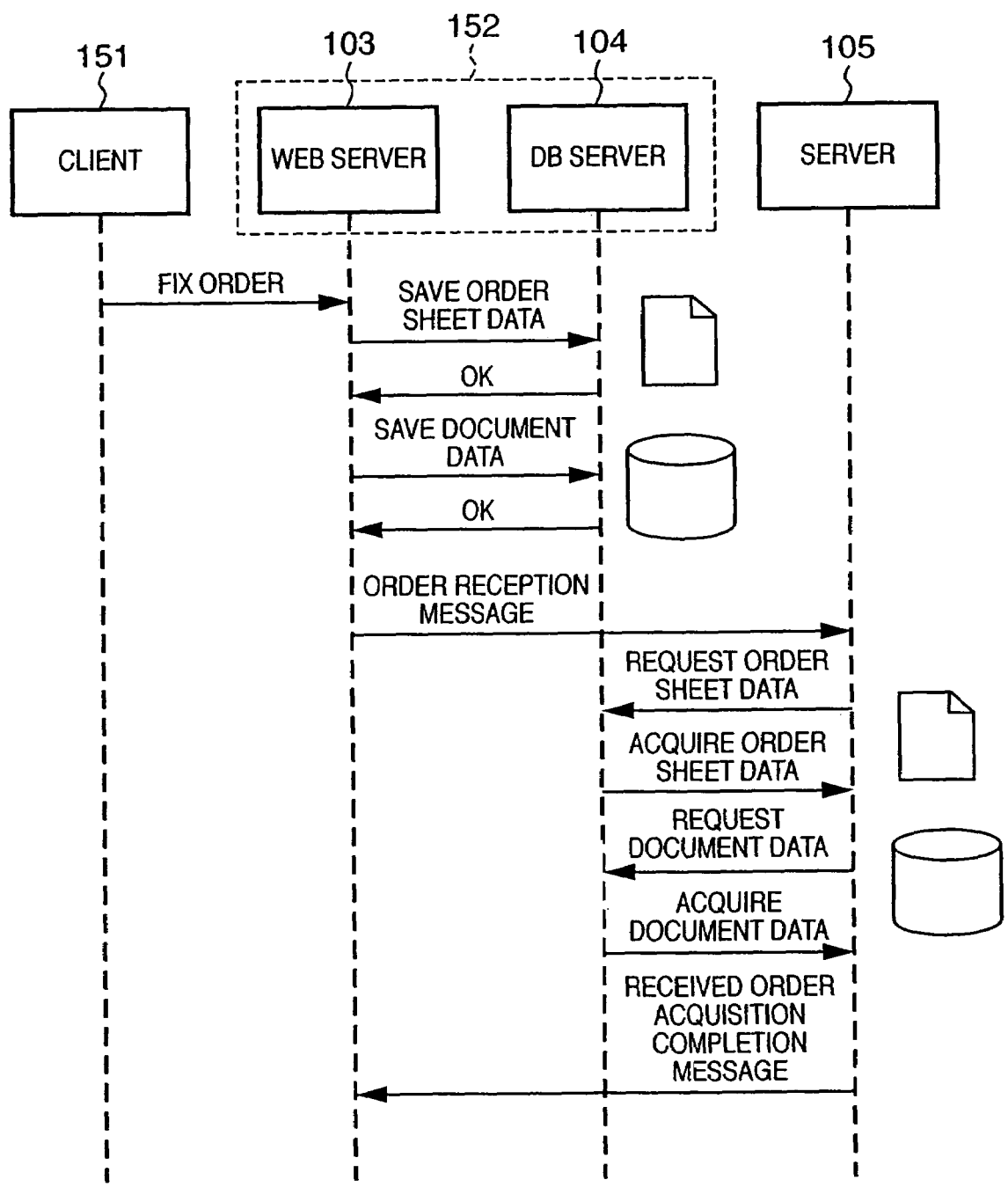
FIG. 5 is a chart showing the processing sequence of the print system according to the embodiment of the present invention.

FIG. 5 shows the processing sequence of the print system according to the embodiment of the present invention.

After order contents input from the client 151 are fixed, the WEB server 103 generates order sheet data and stores it in the DB server 104. Also, when document data is uploaded, the WEB server 103 stores the document data in the DB server 104. Upon completion of the storage processes, the WEB server 103 transmits an order reception message (order reception information) to the server 105 in the print center 153.

Upon reception of this message, the server 105 acquires the order sheet data from the DB server 104. When the document data is uploaded to the DB server 104, the server 105 similarly acquires the document data from the DB server 104. Upon completion of acquisition of the order sheet data and document data, the server 105 transmits a received order acquisition completion message (received order acquisition completion information) to the WEB server 103.

With a series of processes described above, the server 152 and print center 153 are synchronized. At the same time, the server 152 executes order reception processing, and the print center 153 executes print processing. As a result, the load distribution of the processing of the whole system can be achieved.

The functional arrangement of the server 105 in the print center 153 will be described below using FIG. 6.

Figure 6:
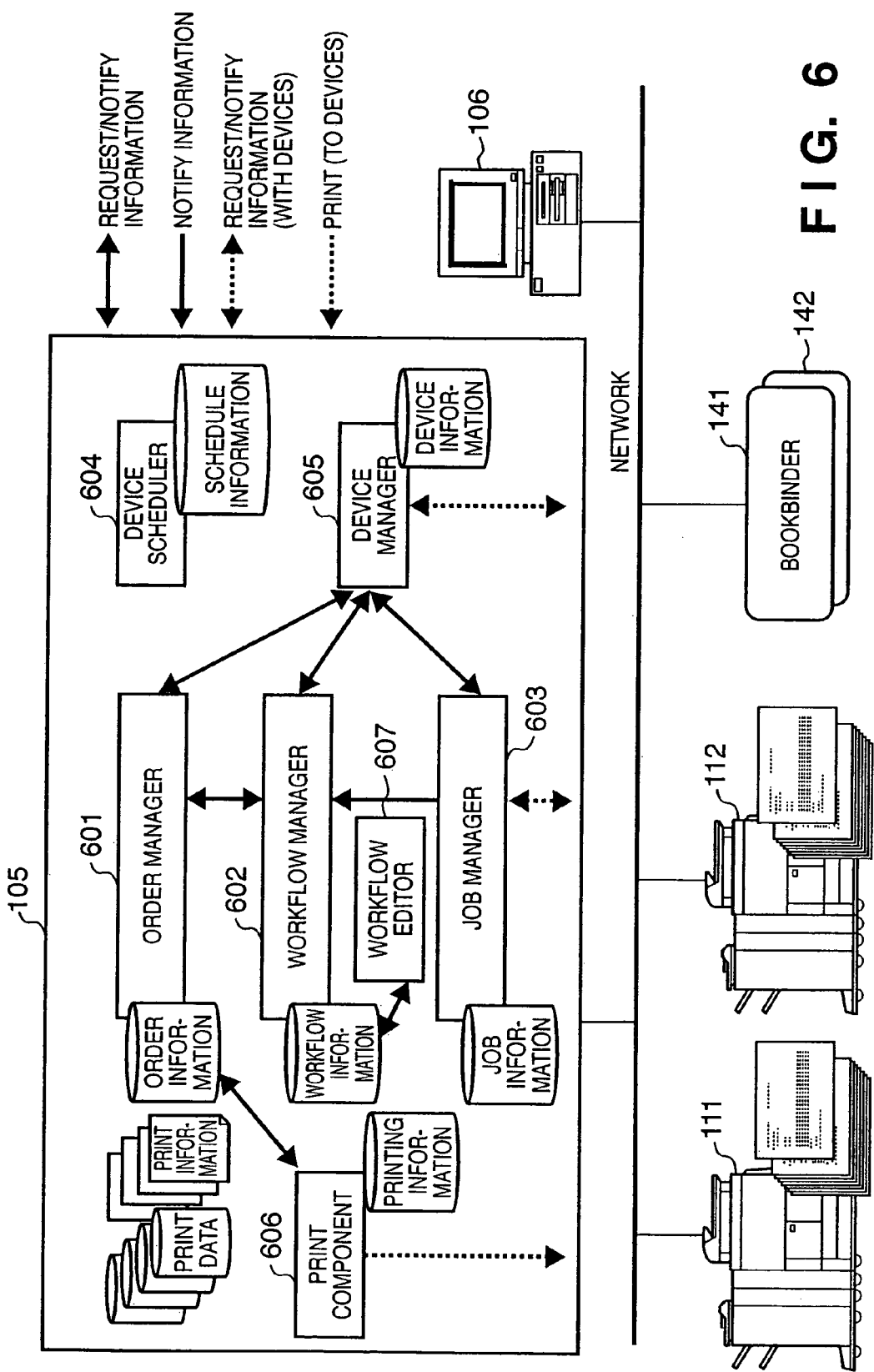
FIG. 6 is a diagram showing the functional arrangement of a server according to the embodiment of the present invention.

FIG. 6 shows the functional arrangement of the server according to the embodiment of the present invention.

Reference numeral 601 denotes an order manager as software which manages entered order information, and generates an operation window shown in FIG. 7 (to be described later). The order manager 601 extracts print information (print style and the like) from the order sheet data collected from the WEB server 103 and DB server 104. The order manager 601 generates order information required for print processing together with a path name of document data (storage location of the document data). FIGS. 14A to 14D show examples of the contents stored in the order information. Note that the meanings of respective values set in the order information are described on the list, and a description thereof will be omitted.

The operation window generated by the order manager 601 will be described below using FIG. 7.

FIG. 7 shows an example of the operation window of the order manager according to the embodiment of the present invention.

Note that an operation window 700 is illustrated as a window example generated by an application which runs on, e.g., the Microsoft Windows® OS, but it may be HTML-based WEB contents. In the description of this embodiment, an example of an Windows® application is used for the sake of simplicity.

The operation window 700 generated by the order manager 601 includes a list display area 701 that presents outline states of orders on the basis of the order information, and a tab display area 702 that displays detailed information of an order. The operator can confirm the progress of an order while observing this operation window 700.

Also, by uploading the identical order information to the WEB server 103 at the status change timing as needed, a processing status contents window (not shown) provided by the WEB server 103 can provide the same information to the user. This order information is held for security protection until the print processing is completed and the order is delivered, but it is erased after delivery.

The list display area 701 displays rough information such as an order ID required to identify each order, person in charge, processing status, and the like, and a scheduled date of delivery. When one order information is selected, details of that order information are displayed on the tab display area 702. Note that the displayed contents include the print style shown in FIGS. 14A to 14D.

A workflow editor 607 shown in FIG. 6 will be described below using FIG. 8.

Figure 8:
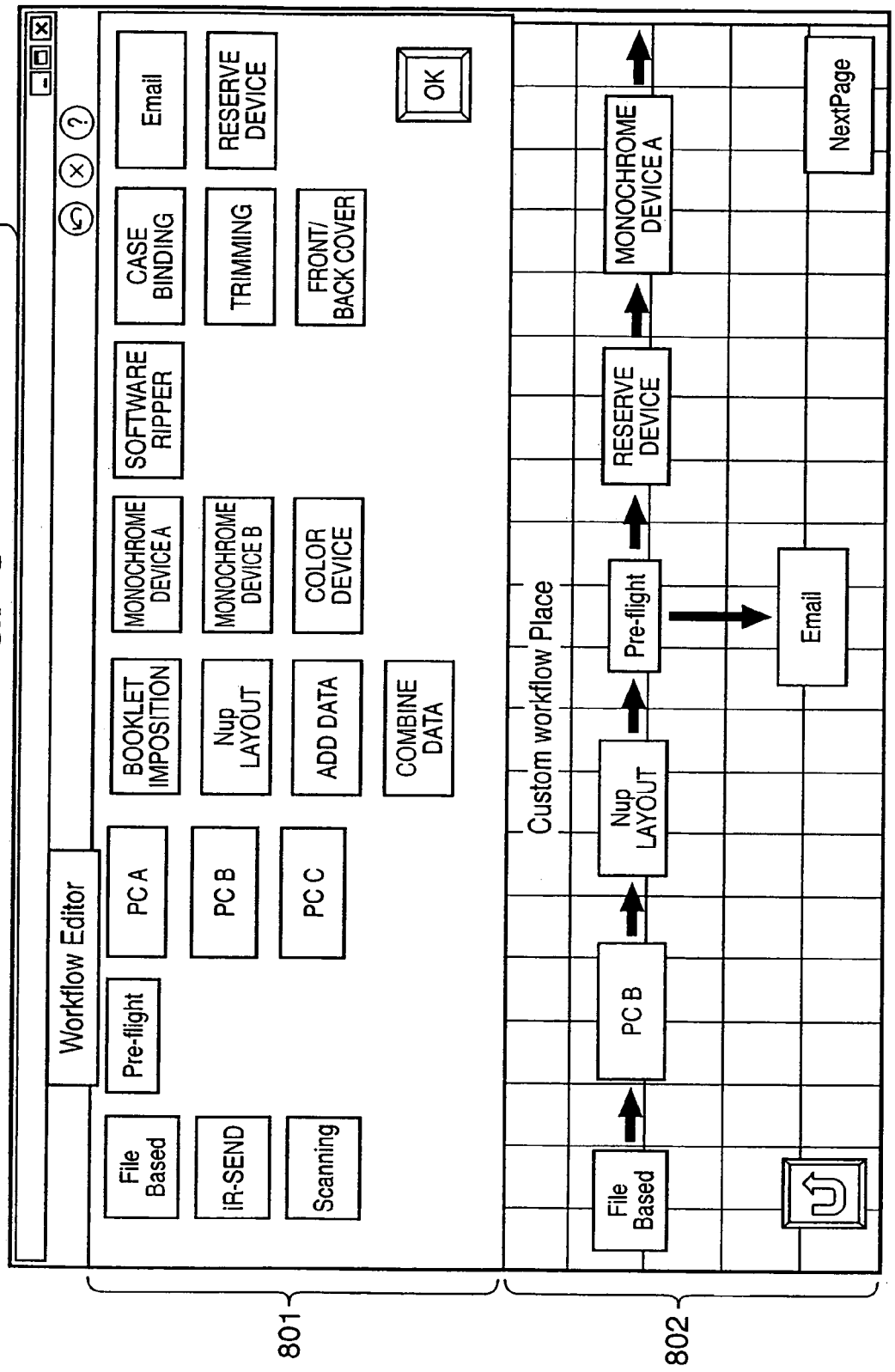
FIG. 8 shows an example of a workflow editor according to the embodiment of the present invention.

FIG. 8 shows an example of the workflow editor according to the embodiment of the present invention.

The workflow editor 607 allows the operator to generate a workflow in accordance with the order information managed by the order manager 601. Note that the workflow indicates the flow of print processes with respect to an order. Generation of the workflow corresponds to that of workflow information to be processed by a workflow manager 602 as software that manages the print workflow.

FIG. 8 shows an operation window 800 generated by the workflow editor 607. Note that icon members (blocks) laid out on an upper area 801 respectively indicate steps and devices having functions in print processing. These icon members are adaptively displayed in correspondence with each print center. By laying out and building up these blocks indicating the steps and devices on a lower area 802 as needed, a workflow required to realize the order can be generated.

The workflow manager 602 in FIG. 6 will be described below using FIG. 9.

FIG. 9 shows an example of the workflow manager according to the embodiment of the present invention.

The workflow manager 602 allows the operator to load the workflow generated by the workflow editor 607 to itself, and to operate the workflow and manage its progress. On the workflow manager 602, an operation window 900 which visually displays the progress (status information) of that workflow is generated.

The operator performs operations determined for respective steps on the basis of the status information. The operator himself or herself changes the status of the complete step. The status may be automatically changed depending on steps. For example, in an online print device, the status is changed in response to a print completion message from a job manager 603.

A device scheduler 604 in FIG. 6 will be described below using FIG. 10.

FIG. 10 shows an example of the device scheduler according to the embodiment of the present invention.

The device scheduler 604 allows the operator to reserve a print schedule of a printer that matches the order condition when the status of the workflow manager 602 becomes "device reservation". For this purpose, the device scheduler 604 generates an operation window 1000 (schedule management window) used to reserve a print schedule.

In order to carry out a print service in large quantities as scheduled, shared printers must be efficiently and systematically operated. For this purpose, the operator must avoid conflicting use and achieve planned management using a schedule system. Hence, the operation window 1000 shown in FIG. 10 shows an example of a schedule system which can manage print schedules of a plurality of printers, and can simultaneously display the status of print schedules for respective printers. This schedule system is implemented by the device scheduler 604.

The operator selects an arbitrary pointer 1001 using an input device such as a keyboard, mouse, or the like on the operation window 1000 which is generated by launching the device scheduler 604 from the work PC 106. The operator then specifies a use period 1002 (reserved region) in a rectangular pattern (rectangular region) using the input device on a schedule display area 1003 which is defined by the time axis in correspondence with the selected printer 1001, thus making reservation (registration).

In FIG. 10, the use period 1002 is expressed by a rectangular region, but it is merely an example. For example, the display pattern of the use period 1002 is not particularly limited as long as the use period 1002 is information including the display pattern that can be easily recognized (a line segment or arrow indicating the range of the use period, a character string indicating a duration, and the like).

The job manager 603 in FIG. 6 will be described below using FIG. 11.

FIG. 11 shows an example of the job manager according to the embodiment of the present invention.

When the status of print processing is reached on the workflow manager 602, the operator launches a print component 606 from the work PC 106.

The print component 606 acquires registered print data and print information from the order information of the order manager 601, and downloads these data to the work PC 106 as printing information. The operator selects print data of the order of interest on the work PC 106, and inputs a print instruction. When print processing starts in response to the print instruction, the job manager 603 communicates with the monochrome printer 111, color printer 112, or the like to monitor the print status of the print job. Note that the job manager 603 is implemented by software that manages print jobs.

The job manager 603 generates an operation window 1101 used to display information (job list 1102) of print jobs whose status data change sequentially as its monitor state. On this operation window 1101, an arbitrary print job can be controlled (print cancel or the like).

The operator displays the operation window 1101 generated by the job manager 603 on the work PC 106. The user can confirm document names given to print data, the status data (output in progress, wait for output, suspended, and the like) of print jobs, reception times of the print jobs, and the like on the operation window 1101.

The operator can make operations, e.g., he or she can select an arbitrary print job, change its status, and so forth using the input device. The job manager 603 has an alternative printing function of using, when a failure has occurred in a given device, a normal alternative device in place of that failed device. Also, the job manager 603 has a distributed printing function of distributing one job to a plurality of devices upon printing. Furthermore, the job manager 603 has a color/monochrome distributed printing function of determining color or monochrome pages, and distributing them to the color and monochrome printers.

A device manager 605 in FIG. 6 will be described below using FIGS. 12 and 13.

Figure 13:
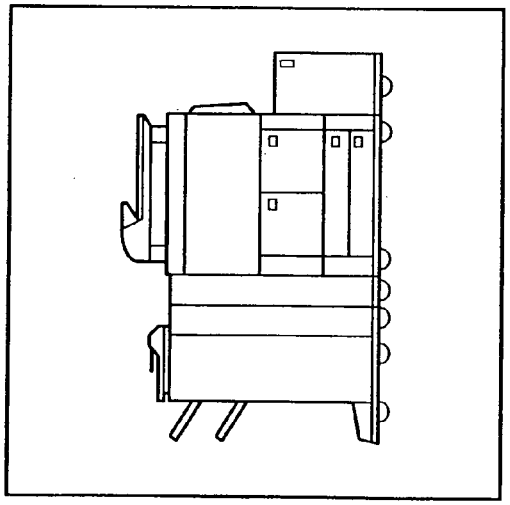
FIG. 13 shows an example of the device manager according to the embodiment of the present invention.

FIGS. 12 and 13 show an example of the device manager according to the embodiment of the present invention.

The device manager 605 as software that manages devices used in various print processes manages installation information (network address, administrator) of each device (printer). The device manager 605 periodically communicates with each printer to acquire and manage its status (operation state, error/warning state) information. FIG. 12 is a display window which is generated by the device manager 605 and displays a list of installation information of respective printers.

Also, the device manager 605 periodically communicates with each printer to acquire and manage its device information including performance information (processing speed per unit time, finishing functions of bookbinding/stapling/punching and the like) and expendable information (print sheets/toner/staples and the like). FIG. 13 is a display window which is generated by the device manager 605 and especially displays expendable information (paper sheets) of an arbitrary printer of the device information.

The device manager 605 has a function of sequentially notifying device information in accordance with requests from the order manager 601, workflow manager 602, and job manager 603.

The workflow manager 602 returns its status in response to a status acquisition request from the order manager 601. As a result, the order manager 601 can display the status corresponding to its status acquisition request on the order manager 601.

Device information (printer information) of each of printers managed by the device scheduler 604 will be described below using FIG. 15.

Figure 15:
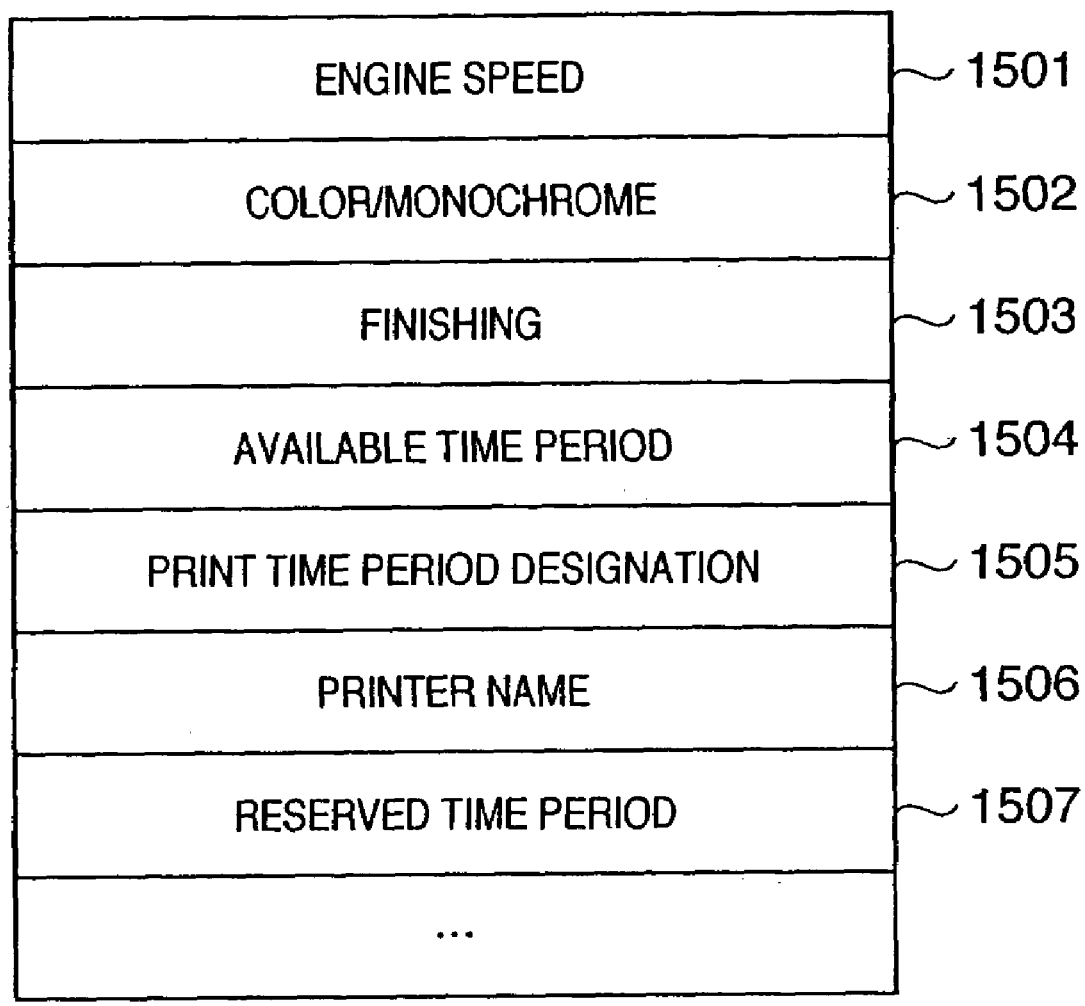
FIG. 15 shows an example of device information managed by the device scheduler according to the embodiment of the present invention.

Referring to FIG. 15, an engine speed field 1501 indicates the print performance (ppm) of the printer. A color/monochrome field 1502 indicates that the printer of interest is a color or monochrome printer. A finishing field 1503 indicates a finishing function (double-sided, stapling, bookbinding, and the like) of the printer of interest.

An available time period field 1504 indicates an available time period of the printer of interest until the next reserved time period of the printer which is not set with the reserved time period at the time of occurrence of any failure. A printer name field 1506 indicates a printer name managed by the device scheduler 604.

A reserved time period field 1507 indicates a reserved time period input by the operator or input when alternative print processing takes place. The reserved time period 1507 is used to display the available time period 1504 and the rectangular region (use period 1002 in FIG. 10).

The device scheduler 604 manages these pieces of device information (printer information) for respective printers.

Job information of a print job which is input to each printer managed by the device scheduler 604 will be described below using FIG. 16.

FIG. 16 shows an example of job information of a print job according to the embodiment of the present invention.

Referring to FIG. 16, a total page number field 1601 indicates the total number of pages of a print job input to the printer. A printed page number field 1602 indicates the number of printed pages of the job which is input to the printer and whose print processing is in progress.

A color/monochrome field 1603 indicates if the print job input to the printer is color or monochrome printing. A finishing field 1604 indicates finishing settings (double-sided, stapling, and the like) of the print job input to the printer.

A print time period designation field 1605 indicates a completion time limit of the print job, which is stored in the job information based on the value of the available time period 1504 or operator's input. A printer name field 1606 indicates a printer name to which the print job is input initially.

An alternative printer name 1607 indicates an alternative printer name when execution of the alternative printing function occurs.

This job information is held by the job manager 603 or a job ticket of the print job.

The alternative printing function to be executed by the device scheduler 604 and job manager 603 after a failure has occurred in a given device will be described below using FIG. 17.

Figure 17:
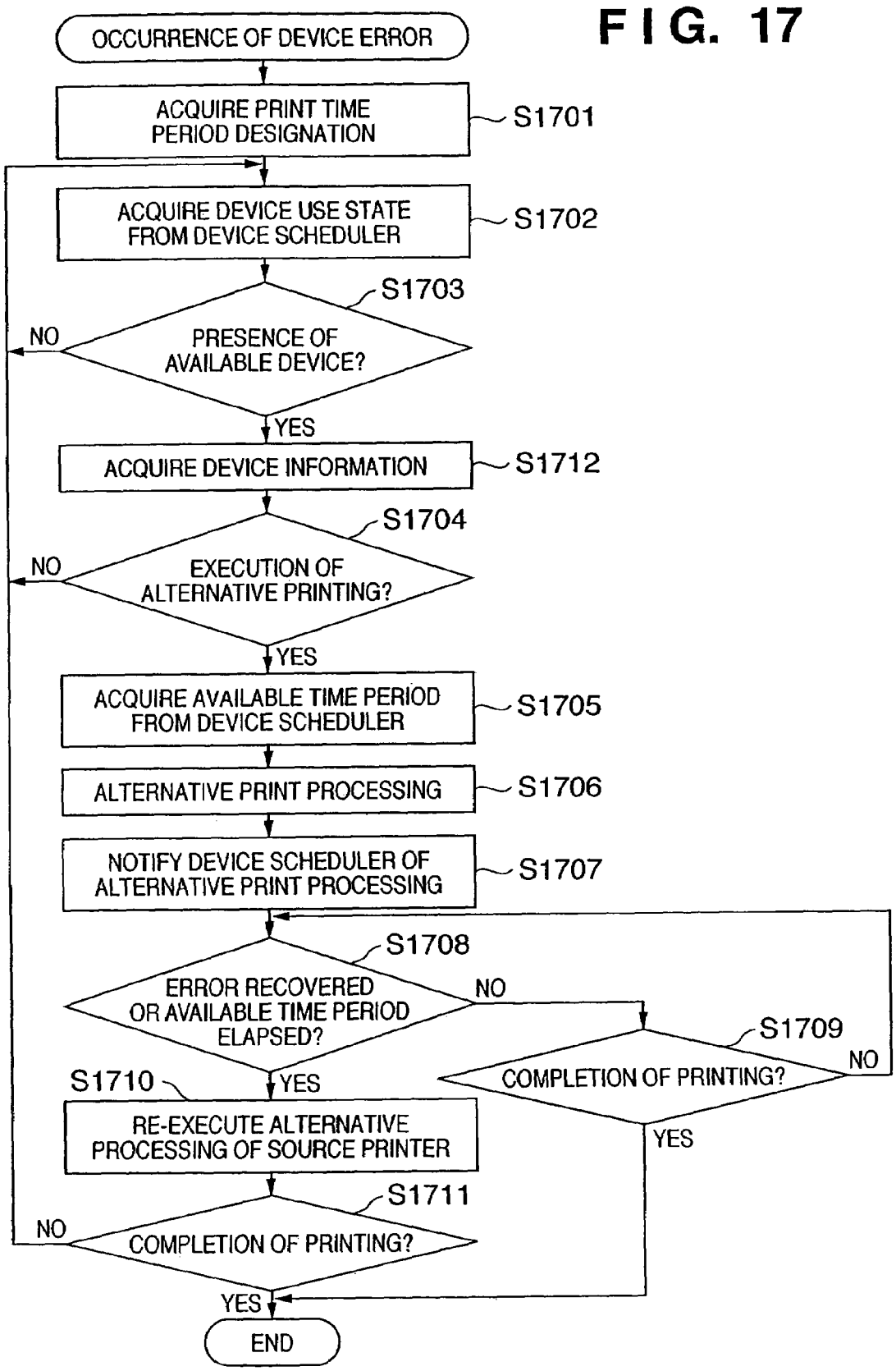
FIG. 17 is a flowchart showing the alternative print processing according to the embodiment of the present invention.

FIG. 17 is a flowchart showing the alternative printing function according to the embodiment of the present invention.

In FIG. 17, upon executing the alternative print processing, a device (printer) which has caused a failure (error) will be described as printer A (source printer), and an alternative printer serving as a request destination of alternative printing will be described as printer B. Also, the state transition of display on a schedule display area 1203 of the operation window 1000 shown in FIG. 10, which changes in accordance with the process shown in FIG. 17 will be described with reference to FIG. 18.

In step S1701, the job manager 603 detects an error of a device (e.g., printer A: 1901 in FIG. 18) (upon reception of a device error message from the device manager 605). The job manager 603 acquires the print time period designation 1605 from the job information of the print job which is being processed by the device from which the error has been detected. In step S1702, the job manager 603 inquires the device scheduler 604 of the reserved states of the printers and acquires device use states.

The job manager 603 determines based on the acquired device use states in step S1703 if devices which are not reserved in the current time zone in which the print job of interest must be processed are present. If devices which are not reserved are found (YES in step S1703), the flow advances to step S1712. If no device which is not reserved is found (NO in step S1703), the flow returns to step S1702.

In step S1712, the job manager 603 acquires all pieces of device information of the printers which are not reserved from the device scheduler 604. The job manager 603 selects a printer which has finishing and color/monochrome functions and a higher engine speed from those which are not reserved. Note that such selection may be set by the operator.

The job manager 603 determines in step S1704 if the alternative print processing is to be executed. This determination step is executed on the basis of the print time period designation 1605 acquired in step S1701, the total number of pages

1601 and the number of printed pages 1602 of the job information, and the device information acquired from the device scheduler 604 in step S1712.

In this embodiment, as an example of this determination method, it is determined whether or not the following inequality is satisfied:

$$\text{(Designated print time period+total number of pages)} \times \text{number of remaining pages} \times \text{engine speed ratio} > \text{remaining time period} \quad (1)$$

Especially, if this inequality is satisfied, it is determined that the alternative print processing is executed. That is, this inequality (1) serves as an alternative condition for determining whether or not the alternative print processing is to be executed.

Note that the designated print time period corresponds to the print time period designation 1605. Also, the number of remaining pages is given by the total number of pages—the number of printed pages. Furthermore, the engine speed ratio is the ratio of the engine speeds 1501 in the device information of the device to which the job is input, and that acquired from the device scheduler 604. Moreover, the remaining time period is given by the current time upon determination—the end time of the designated print time period.

Based on this conditional inequality, the alternative print processing of the print job which is being processed by the device that has caused the error can be executed as follows. That is, the alternative print processing is not executed immediately in response to detection of any error while the print job of interest is completed until its completion limit time (date of delivery), and it can be executed in time for the completion limit time of the print job of interest. Hence, the print job can be assigned to the output device as an initial output destination as much as possible. When the error of that output device is recovered in time for the print job to be completed before its completion limit time, the output device can continue print processing.

If inequality (1) is satisfied (YES in step S1704), i.e., if the alternative condition is generated (1902 in FIG. 18), the flow advances to step S1705. On the other hand, if inequality (1) is not satisfied (NO in step S1704), the flow returns to step S1702.

In step S1705, the job manager 603 acquires the available time period 1504 of a printer (e.g., printer B) that satisfies inequality (1) from the device scheduler 604.

In step S1706, the printer (alternative printer) that satisfies inequality (1) executes the alternative print processing of the print job which is input to the printer that has caused the failure. In this case, the job manager 603 sets the printer name of the alternative printer in the alternative printer name field 1607 of the job information.

In step S1707, the job manager 603 notifies the device scheduler 604 of execution of the alternative print processing. The device scheduler 604 changes the print schedule time period (available time period) of the alternative printer. Also, the device manager 604 updates to display a rectangular region indicating the new print schedule time period of the alternative printer in correspondence with the available time period (1903 in FIG. 18).

The job manager 603 determines in step S1708 if the failure of the failed printer is recovered or the available time period of the alternative printer has elapsed. If the failure of the printer is recovered or the available time period of the alternative printer has elapsed (YES in step S1708), the flow advances to step S1710; otherwise (NO in step S1708), the flow advances to step S1709.

It is checked in step S1709 if the alternative printer has completed the alternative print processing of the print job to be processed. If the print processing is not complete yet (NO in step S1709), the flow returns to step S1708.

On the other hand, if the print processing is complete (YES in step S1709), the job manager 603 notifies the device scheduler 604 of a message that advises accordingly, thus ending the processing. In this case, the device scheduler 604 updates the print schedule time periods of the printer before alternative processing (printer A) and printer after alternative processing (printer B) (1905 in FIG. 18), and clears display of the corresponding rectangular region (reserved region) on the operation window 1000.

On the other hand, if it is determined in step S1708 that the failure of the failed printer is recovered or the available time period of the alternative printer has elapsed (YES in step S1708), the flow advances to step S1710. In step S1710, the alternative print processing of the job is re-executed using the printer before alternative processing (source printer (printer A)). The job manager 603 notifies the device scheduler 604 of re-execution of alternative processing. Also, the device scheduler 604 clears display of the rectangular region (that added in 1903 in FIG. 18) on the operation window 1000, which corresponds to the printer indicated by the alternative printer name 1607 (1904 in FIG. 18).

It is checked in step S1711 if the print processing is complete. If the print processing is not complete yet (NO in step S1711), the flow returns to step S1702.

Figure 18:
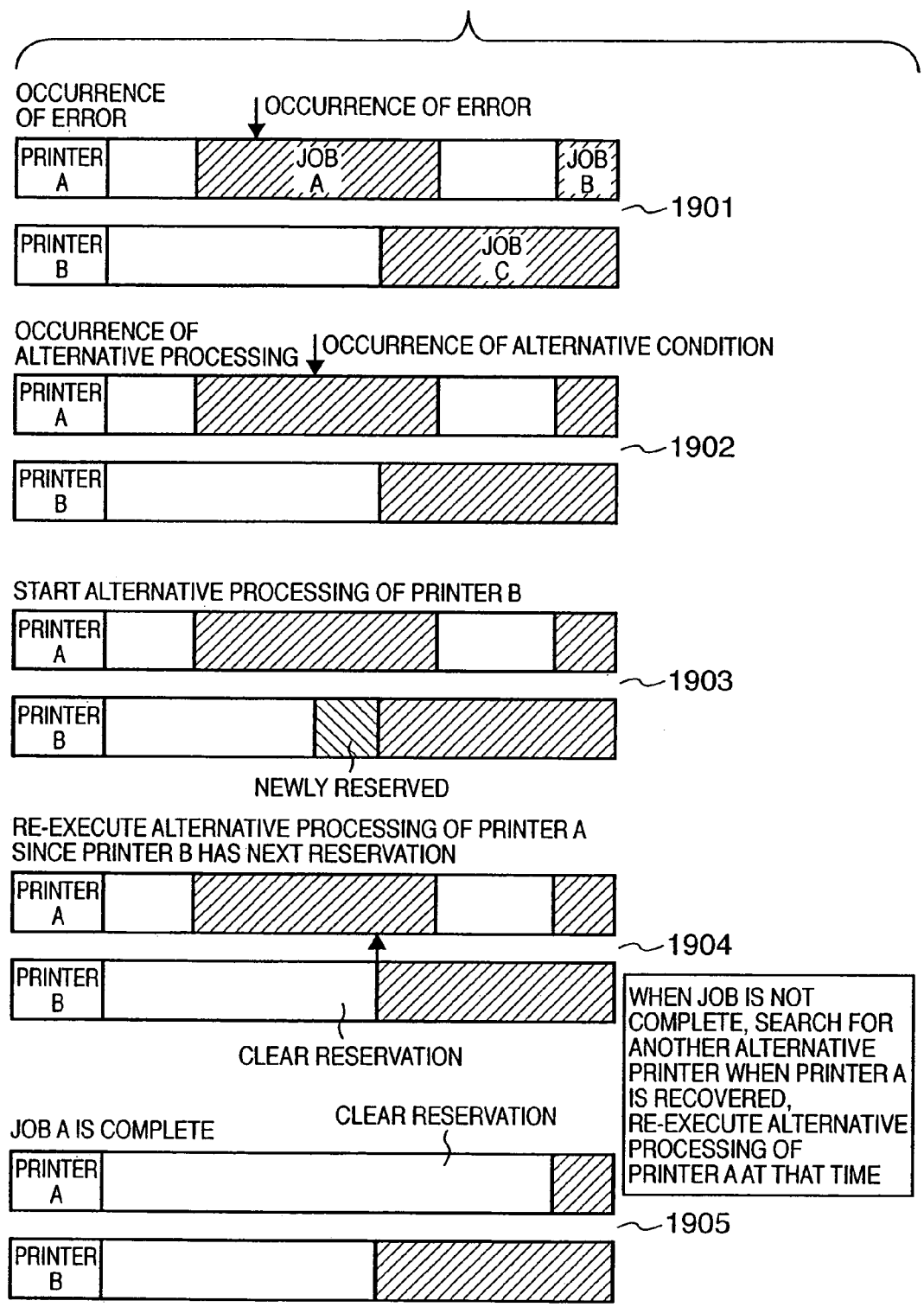
FIG. 18 is a state transition chart of display of a schedule area according to the embodiment of the present invention.

If the print processing is complete (YES in step S1711), the device scheduler 604 clears display of the rectangular region on the operation window 1000, which corresponds to the printer before alternative processing (1905 in FIG. 18).

The update processing for updating display on the operation window 1000 after the job manager 603 notifies the device scheduler 604 of execution of the alternative print processing will be described below using FIG. 19.

Figure 19:
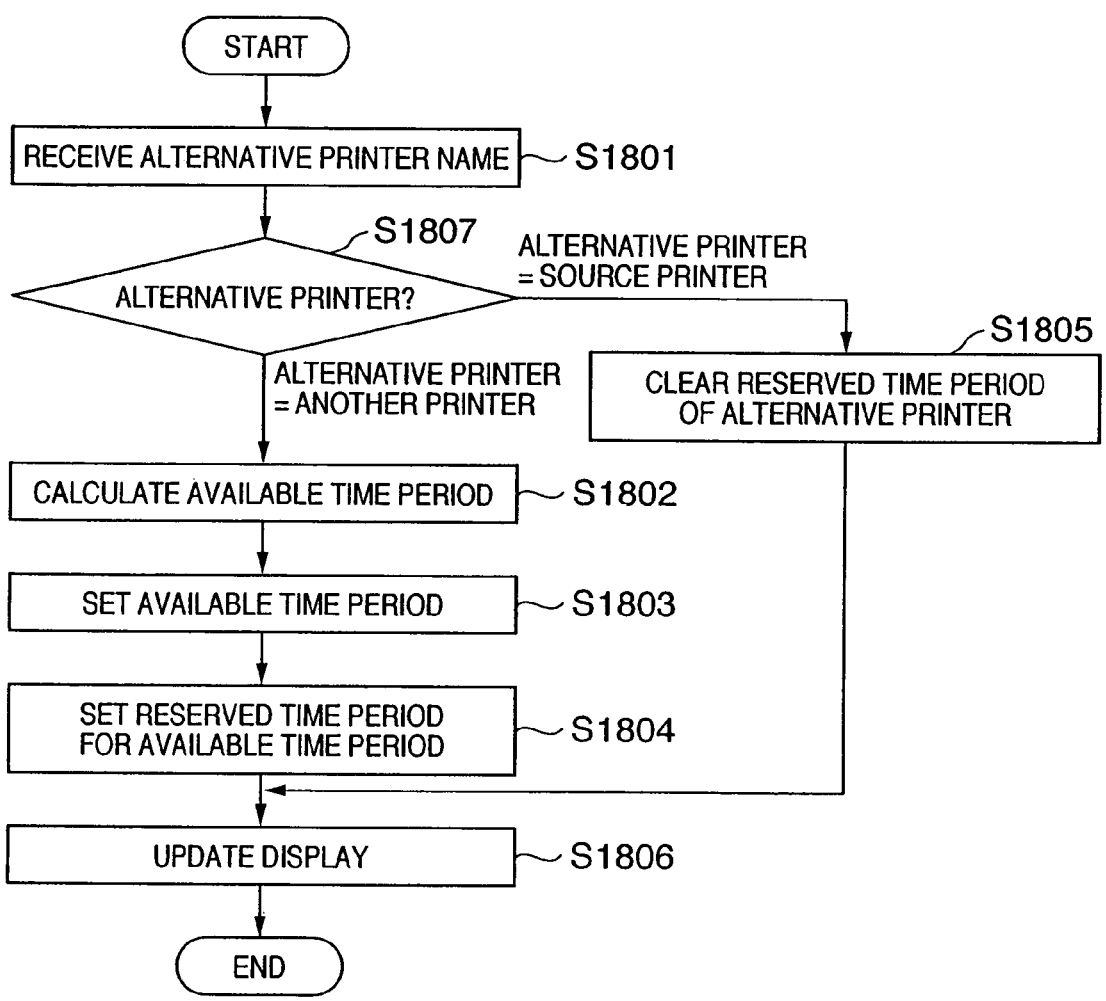
FIG. 19 is a flowchart showing the update processing according to the embodiment of the present invention.

FIG. 19 is a flowchart showing the update processing according to the embodiment of the present invention.

In step S1801, the device scheduler 604 receives the alternative printer name 1607 of the job information from the job manager 603. In step S1807, the alternative printer is determined. If the alternative printer is a printer other than the source printer, the flow advances to step S1802.

In step S1802, the available time period is calculated. In this embodiment, a time period until the next reserved time period of the alternative printer is defined as the available time period. In step S1803, the calculated available time period is set in the available time period field 1504 of the device information. In step S1804, the reserved time period 1507 of the alternative printer is corrected (set) using the set available time period 1504.

On the other hand, if the alternative printer is the source printer, the reserved time period of the alternative printer set in step S1804 is cleared in step S1805.

In step S1806, the width of the corresponding rectangular region on the operation window 1000 is corrected on the basis of the reserved time period changed in step S1804 or S1805, thus updating display.

As described above, when any error of the printer has occurred, the job manager 603 holds the print time period designation information (indicating a time period (minutes) within which the job must be completed, the reserved time period of the device scheduler 604, or the like). If a predetermined condition based on the job information and the device information of the printer that has caused the error is satisfied, the use states (ready states, possible reservation time periods, engine speeds) of printers are received from the device scheduler 604. Based on the use states, (a plurality of) available printers which are ready are selected as alternative printers which execute alternative print processing of distributed jobs of the job information.

If the printer (source printer) that has caused the error is recovered, the print processing is executed by the source printer. If the alternative printer used in the alternative processing has the next reserved time period, the print job of pages to be printed is temporarily returned to the source printer when the reserved time period is reached. Then, the device scheduler 604 is inquired of the use states of printers again to select a new alternative printer.

That is, the print schedules of respective printers and information of the print management system (job manager 603 and device scheduler 604) are exchanged. In this way, even when any error (failure) has occurred in the printer, the alternative processing is not immediately started if the print processing can be completed until its time limit, and the alternative processing of another printer is started if the print processing is expected not to meet the due date. Hence, execution of the alternative processing against the user's intention can be prevented. Even when the alternative processing is made, the printers can be efficiently used to preferably complete the print processing within the due date. Furthermore, the influence of the alternative print processing on the schedules of printers can be minimized.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-250929 filed Aug. 30, 2004, which is hereby incorporated by reference herein.

What is claimed is:

1. An information processing apparatus connected to a plurality of printers via a network, comprising:
a detecting unit configured to detect a failure of a first printer among the plurality of printers;
an acquiring unit configured to acquire a completion time limit of the print job, when any failure is detected in the first printer serving as an output destination of a print data included in the print job by the detecting unit;
a determination unit configured to determine whether or not an alternative print processing is to be executed, based on the completion time limit of the print job and information of the plurality of printers,
wherein the determination unit determines the alternative print processing is not to be executed, when the print job is completed by the completion time limit of the print job, while determines the alternative print processing is to be executed, when the print job is not completed in time for the completion time limit of the print job; and
a controlling unit configured to control a second printer among the plurality of printers to print the print data served in the first printer if the determination unit determines the alternative print processing is to be executed.

2. The apparatus according to claim 1, wherein said controlling unit controls the first printer or the second printer so as to print the print data again, which is cancelled and not printed due to the failure detected by said detecting unit.

3. The apparatus according to claim 1, wherein the first time period is a scheduled time period when print of the print data is completed.

4. The apparatus according to claim 1, wherein said acquiring unit acquires the first time period, in addition to, the second time period based on the number of pages of the print data and print performance of the first printer.

5. The apparatus according to claim 1, wherein said acquiring unit acquires the first time period, in addition to, the second time period based on a print performance of the second printer.

6. The apparatus according to claim 1, wherein said determination unit determines whether or not the alternative print processing is to be executed by comparing remaining time period from the completion time limit of the print job in the current time upon determination with time required when the alternative print processing is executed.

7. The apparatus according to claim 6, wherein said determination unit determines whether or not the alternative print processing is to be executed by comparing the remaining time with time required when the alternative printing is executed for the remaining pages which is still not printed in the print data.

8. The apparatus according to claim 6, wherein the determination unit determines the alternatives print processing is not to be executed when the print job is completed by the completion time limit of the print job by the alternative print processing, and determines the alternative print processing is to be executed, when the print job is not completed in time for the completion time limit of the print job by the alternative print processing.

9. The apparatus according to claim 1, further comprising a selection unit configured to select a printer among the plurality printers which are not reserved in current time zone, and has color functions and a higher engine speed as the second printer executing the alternative print processing.

10. The apparatus according to claim 1, wherein the determination unit determines the alternatives print processing is not to be executed when the print job is completed by the completion time limit of the print job by the alternative print processing, and determines the alternative print processing is to be executed, when the print job is not completed in time for the completion time limit of the print job by the alternative print processing.

11. A method of controlling an information processing apparatus connected to a plurality of printers via a network, comprising:
 a detecting step of detecting a failure of a first printer among the plurality of printers;
 an acquiring step of acquiring a completion time limit of the print job, when any failure is detected in the first printer serving as an output destination of a print data included in the print job in the detecting step;
 a determination step of determining whether or not an alternative print processing is to be executed, based on the completion time limit of the print job and information of the plurality of printers,
 wherein the determination step determines the alternative print processing is not to be executed, when the print job is completed by the completion time limit of the print job, while determines the alternative print processing is to be executed, when the print job is not completed in time for the completion time limit of the print job; and
 a controlling step of controlling a second printer among the plurality of printers to print the print data served in the first printer if the determination step determines the alternative print processing is to be executed.

12. The method according to claim 11, wherein in said controlling step the first printer or the second printer is controlled so as to print the print data again, which is cancelled and not printed due to the failure detected in said detecting step.

13. The method according to claim 11, wherein the first time period is a scheduled time period when print of the print data is completed.

14. The method according to claim 11, wherein in said acquiring step the first time period is acquired, in addition to, the second time period based on the number of pages of the print data and print performance of the first printer.

15. The method according to claim 11, wherein in said acquiring step the first time period is acquired, in addition to, the second time period based on a print performance of the second printer.

16. The method according to claim 11, wherein the determination step determines the alternatives print processing is not to be executed when the print job is completed by the completion time limit of the print job by the alternative print processing, and determines the alternative print processing is to be executed, when the print job is not completed in time for the completion time limit of the print job by the alternative print processing.

17. A program, stored on a computer-readable medium, for causing an information processing apparatus connected to a plurality of printers via a network to execute a control method, the control method comprising:
 a detecting step of detecting a failure of a first printer among the plurality of printers;
 an acquiring step of acquiring a completion time limit of the print job, when any failure is detected in the first printer serving as an output destination of a print data included in the print job in the detecting step;
 a determination step of determining whether or not an alternative print processing is to be executed, based on the completion time limit of the print job and information of the plurality of printers,
 wherein the determination step determines the alternative print processing is not to be executed, when the print job is completed by the completion time limit of the print job, while determines the alternative print processing is to be executed, when the print job is not completed in time for the completion time limit of the print job; and
 a controlling step of controlling a second printer among the plurality of printers to print the print data served in the first printer if the determination step determines the alternative print processing is to be executed.

* * * * *